May 4, 1948.　　　　J. S. HICKS　　　　2,441,097
PLASTICS MOLDING APPARATUS
Filed June 15, 1946
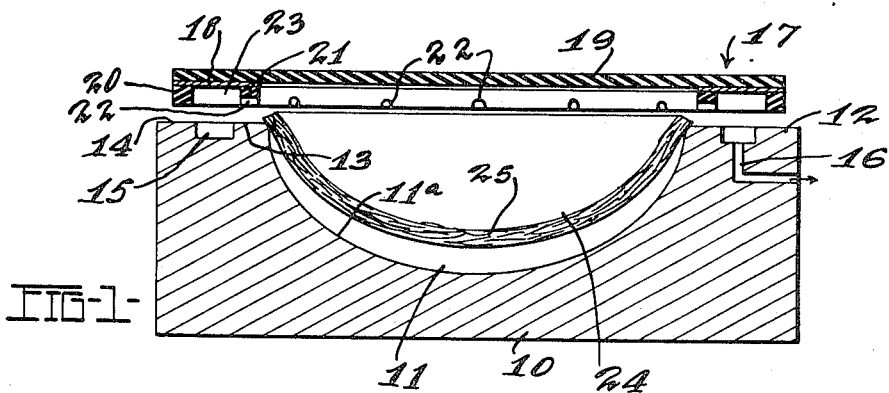
FIG-1-
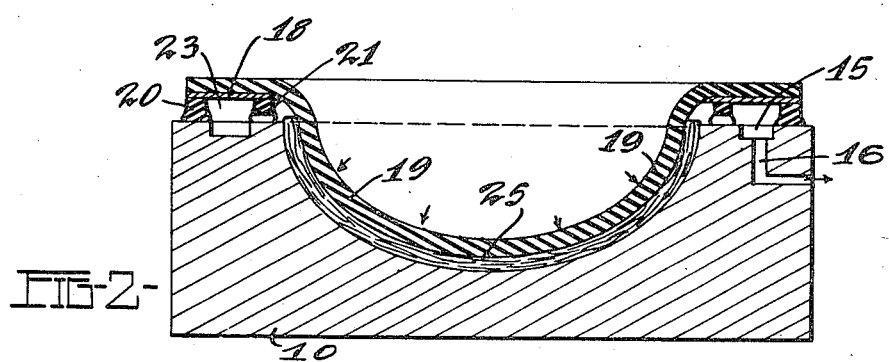
FIG-2-
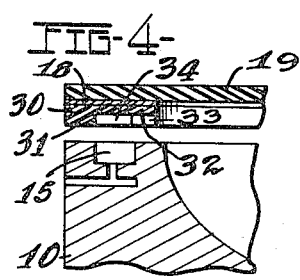
FIG-4-
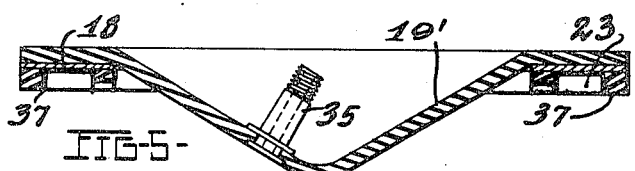
FIG-5-
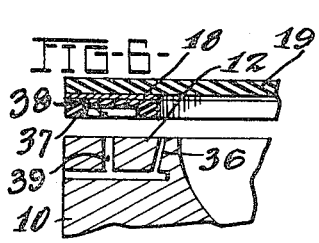
FIG-6-
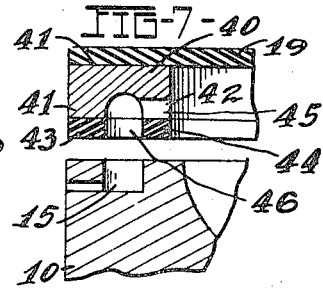
FIG-7-
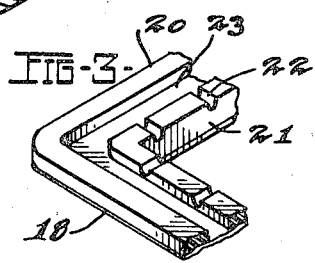
FIG-3-
INVENTOR.
Joseph S. Hicks
BY
Staelin & Overman
ATTORNEYS Patented May 4, 1948

2,441,097

UNITED STATES PATENT OFFICE 2,441,097

PLASTICS MOLDING APPARATUS

Joseph S. Hicks, Toledo, Ohio, assignor to Owens-Corning Fiberglas Corporation, a corporation of Delaware Application June 15, 1946, Serial No. 676,945

9 Claims. (Cl. 18—19)

This invention relates to the molding and laminating of plastic materials at relatively low pressures.

Many processes and techniques for the fabrication of plastic materials have been developed. However, from the standpoint of economy and productivity in the molding of relatively large structural parts, the recently developed low-pressure molding techniques are important.

The advantages of the newly developed technique are readily appreciated, not only for the savings resulting from the use of lower pressures and temperatures during the curing cycle, but also for the low cost and speed at which the forming dies can be produced; the substantially unlimited size of the articles formed thereby; the economies enabling profitable production of low volume items; and the ability to mold intricate shapes, undercuts or thin sections without impairing the strength of the molded article. In addition, the low pressure molding technique is particularly adapted for the fabrication of fibrous reinforced resinous materials having relatively poor flow, only sufficient forces being desired to form a compact composite mass conforming to the contour of the mold. Although reinforcement may be readily effected with the commonly used organic wood, cotton or other textile fibers, particular advantage is derived from the use of inorganic fiber, especially those formed of glass, in view of their high strength, clarity, inertness, and heat resistance. Fibers of the type described may be used in the form of a woven textile sheet having sufficient extensibility to conform to the mold contour, or else they may be haphazardly felted in a fabric or mat in a manner enabling deformation without subsequent thinning out of the fibers or tearing of the fabric during molding.

Heretofore, the advantages of low pressure molding have been to some extent offset by the disproportionate amount of labor and time expended in the performance of each cycle of molding operations greatly to handicap the ready acceptance of the low pressure molding technique as a competitive molding process. It is a desideratum to eliminate some of the time consuming and laborious steps in the fabrication process, such, for example, as the use of numerous C clamps for properly anchoring the flexible blanket to the mold block or the all-inclusive rubber-like blanket, thereby, ultimately, to lower the costs of the molded article in view of the savings of material, time and labor.

It is an object of this invention to provide new and improved molding equipment for low-pressure molding, enabling the reduction of the time, labor and materials expended per molding cycle. Another object is to simplify the low-pressure technique for molding and laminating plastic materials.

Other objects and advantages will hereinafter appear and for purposes of illustration, but not of limitation, embodiments of the invention are shown in the accompanying drawings, in which, Figure 1 is a schematic sectional view of the low-pressure molding equipment showing the relation of parts just prior to the forming cycle;

Figure 2 is a sectional view of the elements shown in Figure 1, in position during the curing cycle;

Figure 3 is a perspective fragmentary view of the underside of a frame plate with the attached resilient gaskets;

Figure 4 is a sectional elevational fragmentary view of the coacting mold members, illustrating another modification of the resilient gasket;

Figure 5 is a sectional view of the cover section, showing still another form of the resilient gasket and a preshaped flexible blanket with an attached valve;

Figure 6 is a sectional elevational fragmentary view of a gasket attachment similar to that in Figure 5 but in cooperation with another mold exhaust means; and Figure 7 is a sectional elevational fragmentary view of a modified form of frame plate having attached resilient gaskets.

In one aspect of this invention, a deformable rubber-like sheet, mounted on a removable cover plate, adapted to cover and coact with only one side of the mold block automatically to provide an airtight chamber, replaces the all-enclosing rubber-like blanket or the clamped sheet heretofore used in the low-pressure molding technique of the type described. Savings in time, material and labor result in the use of the improved, light weight, automatically sealing co-acting mold member, and in addition a more uniform void-free and accurately contoured molded article is secured.

In the illustrated embodiment of the invention, the numeral 10 indicates a mold block of steel or cast metal, having a mold cavity 11, the surfaces 11a of which conform exactly to the contour of the desired molded article.

About the perimeter of the cavity 11 is a flat horizontal sealing surface 12, divided into inner and outer lands 13 and 14 respectively by means of an intermediate groove or channel 15 which, as illustrated, is connected with a vacuum source (not shown) by a passage 16 in the mold block 10.

The mold block may equally support a male mold member and may be formed of other low-cost and easily shaped materials capable of withstanding the forces ordinarily developed in low pressure molding of the type described, ranging from ¼ pound to 250 pounds per square inch of mold surface. These materials include cast metals, reinforced sheet metal, plaster of Paris or built-up paper forms. Previously designed molds not having the desired flat sealing surface 12 described, may have workable shoulders or skirts attached, by various means, such as brazing or welding, to the perimeter of the mold form.

Fitting over the mold cavity 11 and the adjacent sealing surface 12 is a removable or hinged cover section 17. This cover comprises a rigid plate or ring 18 surrounding the mold cavity shaped in a manner to surmount the lands 13 and 14 and supports an attached deformable rubber-like sheet 19 on one of its surfaces. Ordinarily, the sheet 19 is sealed on the upper surface by means of suitable adhesive or by vulcanization but it may instead be fastened to the lower side of the plate. The plate 18 may be formed of metal, glass, wood, or rigid synthetic resins. The flexible sheet may be formed of one of the group of natural or synthetic rubber, non-rigid plastics, such as plasticized vinyl copolymer, polyvinyl alcohol, polyvinyl chloride, or polyvinyl butyaldehyde, or other deformable resilient resinous material, and need only cover the mold cavity and lap a portion of the surface of the plate 18 for attachment thereto. Thus, considerable saving in blanket material itself is effected in comparison with the "tucked-in" or all-enclosing blankets, used in the prior processes.

Secured to the underside of the rigid plate is at least an outer gasket 20 and preferably also laterally spaced therefrom an inner gasket 21, both of compressible material such as sponge rubber or the like. The outer gasket 20 is sealed at its joints or connections to the plate 18 to provide a continuous flange about the outer perimeter of the plate and forms an airtight seal on engagement with the land 13, when the cover is in the mounted position. The other gasket 21 abuts the inner land 14 and is provided with spaced gaps or passages 22, whereby the channel 23 formed between the spaced gaskets, contiguous with the groove 15, communicates with the chamber 24 defined by the mold cavity 11 and the cover section 17.

In operation, the material to be molded may be a fibrous mat 25, preformed to the approximate shape of the mold cavity in order that the impregnated fibrous materials, generally having poor flow, will have but a small distance to move accurately to conform to the contour of the mold. If a preform is used, the material may be previously impregnated with a thermosetting resinous material, as by dipping, flow coating or spraying, or a pool process may be used in which a pool, consisting of a predetermined amount of liquid polymerization resin is deposited in the base of the mold cavity. When the latter method of impregnation is used, a coacting male mold member, during the forming process, forces the liquid resins to rise and fill the interstices between the mat fibers, effectively to drive out the air between the interlocked fibers, ultimately to form a void-free molded article. It is evident that in the latter process, advantageous use is made of liquid resins, consisting of polymerizable monomers from which no reaction products are evolved, so that the entire mass is converted to a void-free, infusible and insoluble stage in a relatively short time. Such resin monomers include the allyl compounds and their derivatives, polyhydric alcohols reacted with polybasic acids to produce polyesters, styrene derivatives, and acrylic acid esters and their derivatives, or mixture of the above to produce desirable copolymers.

If a precoated mat is used, the thermosetting resinous binder may consist of one or more of the above polymerizable monomers, or one of the polycondensation type thermosetting resins. Included in the latter are the reaction products of phenol, cresylic acid, urea, melamine, or resorcinol with formaldehyde, furfuraldehyde, or other aldehydes or ketones. The polycondensation resins, ordinarily advanced to an intermediate stage of cure, are impregnated as a solvent solution, emulsion or dispersion of the partially cured resin. After impregnation, enough time is allowed to elapse for the evaporation of the solvents or other volatiles before heat and pressure are applied.

If the mold block contains a male mold member, sheets of textile fabric may be draped about the male mold form, each fabric sheet being interleaved with a resinous film, or else resinous binder may be deposited thereon, as by brushing or spraying before subsequent fabric plies are superposed.

When the molding composition has been positioned, the cover section 17 is placed on the mold block so that the outer and inner gaskets abut the outer and inner lands respectively. A valve, not shown, between the vacuum source and the passage 16 is opened to evacuate the air and vapors within the chamber 24 through the gaps 22, channels 23 and 15 and passage 16.

Since the gaps 22 are disposed about the perimeter of the mold cavity, it is evident that the exhaustion of the air and volatiles from within the chamber 24 will take place evenly and systematically. Withdrawal of the air and volatiles decreases the pressures within the chamber and causes the outer gasket 20 more intimately to engage the land 14, automatically and progressively to provide a more efficient airtight seal, as illustrated in Figure 2. The inner gasket 21, in the meantime, disposed between the inner perimeter of the plate 18 and the land 13, operates as a support for the plate 18. This supporting function may be provided by a metal rib, wooden strip or the like fastened to the plate 18 in place of the strip of compressible material forming the gasket 21, it being only necessary to prevent tilting of the plate under the atmospheric pressure thereon when the space 23 is evacuated.

The atmospheric forces operating in response to the reduced pressures inside the chamber 24 deform the flexible sheet 19, in a manner to urge the molding composition into intimate contact with the surface of the mold cavity, pressing the molding material into a composite dense mass which accurately conforms to the contour of the mold surface 11a. The space resulting between the deformed sheet 19 and the gasket supported plate 18 exposes the entire perimeter of the mold form to the exhausting means effectively to prevent the sealing-off of the exhaust from any part of the molding material, obviating a problem evidenced in other low-pressure molding methods where the air and volatiles are exhausted from a single port substantially in contact with the liquid resinous impregnated molding material. Residuary air pockets are thereby prevented and an acceptable void-free molded article normally is obtained.

The metal mold block may be channeled for the passage of steam or water for heating and cooling purposes, or else the mold block may be heated by electrical coils wound therein. Other widely used means for elevating the temperature of the molding material for conversion of the resins to the cured stage consist in disposing the entire assembly in an oven or else in a steam-heated autoclave where, also, additional vapor pressures may be applied externally more intimately to force the flexible blanket into contact with the mold form.

After the molded article has been sufficiently cured it may be removed while hot, simply on disengagement of the cover 17 from the mold block.

Materials forming the deformable sheet 19 have limited elongation at various temperatures and, therefore, if the contour of the mold form or the draw is such that the extensible limitation is approached, the sheet cannot be sufficiently flexed accurately to conform to the contour of the mold. In such instances it is expedient to preshape the deformable sheet substantially to conform to the mold contour; such preshaped sheet may be made by curing the rubber-like materials on forming the plastic sheets in suitably heated preshaped molds. A flexible sheet of the latter type is illustrated in Figure 5, and has an attached valve which may operate as the sole or as an additional means for exhausting the air and volatiles from within the enclosed chamber. Where the valve operates as the sole means of evacuating the space beneath the sheet, it is preferable to interpose a porous material such as a layer of unimpregnated glass fiber or cotton cloth, felt or mat between the sheet and the molding composition to aid in bleeding air from all of the area under the sheet and the plate 18.

It is evident that other modifications of sealing gaskets may be used effectively. Figure 4 illustrating a channeled integral rubber strip, having a pair of spaced inner and outer flanges 31 and 32, disposed in parallel relation and spaced apart cut-out portions 33 on the inner flange 32, for purposes enabling communication between the chamber 24 and the channel 34 contiguous with the exhaust channel 15.

Air from the closed chamber may also be exhausted by a passage 36 through the mold block 10 connecting the closed member with the vacuum source, as illustrated in Figure 6, a single resilient rubber-like gasket 37 having a central channel 38 therein may be used between the mounting plate 18 and the sealing surface 12. A passage 39 in the mold block communicates with the channel 38 and the passage 36.

Figure 7 illustrates another form of mounting plate, consisting of a formed sheet metal structure 40, having an upper surface 41 for attachment of the rubber-like sheet 19, and a pair of spaced parallel depending legs 41 and 42 to which strips 43 and 44 of resilient gasket material are attached. The inner leg 42 has spaced apart dents or grooves as at 45, providing passages between the closed chamber 24 and the channel 46 formed between the depending legs.

The above mounting bracket may be readily formed from sheet metal to comprise a rigid readily movable cover section, facilitating the mounting or removal of the cover on or off of the mold block. The intermediate channel enables a uniform and certain distribution of the exhaust forces, as previously pointed out.

It is expedient to provide adhesive means, such as rubber cement or any other conventional adhesive, for securing the rubber or rubber-like gaskets and the rubber or rubber-like blanket to the metallic mounting plate so that replacement thereof may be effected, in view of the limited life of the flexible materials when repeatedly exposed to heat and deformation during molding operations.

It is manifest that considerable saving results from the reduction in the amount of rubber-like sheet material use in the apparatus described, particularly in comparison to the heretofore used all-enclosing blanket or even blankets tucked and clamped over one side wall of the mold form, as by C clamps.

Further, it is manifest that I have produced means for the improvement and simplification of the low-pressure molding techniques, namely; a deformable member having relatively nondeformable margins under which pressures below atmospheric may be created to effect a seal automatically between the molding chamber and the outside atmosphere; means enabling more uniform distribution of the exhaustive forces; and means to seal off sections of molding material. These greatly simplify the molding process and substantially reduce the time and correspondingly the labor heretofore expended in molding large articles by the low-pressure method.

It is to be understood that changes may be made in the details of construction, arrangement and operation of the mold and other parts without departing from the spirit of the invention, especially as defined by the following claims.

I claim:

1. Molding apparatus of the character described comprising a relatively rigid mold form adapted to receive the material to be molded, a flexible member cooperating with the mold form to form a molding space therebetween, sealing means secured to the marginal portions of said flexible member and interposed between said flexible member and the mold form all around the molding space when in the assembled relation, and means for evacuating the molding space sufficiently to deform the flexible member to effect the desired molding operation and concomitantly to cause the sealing means to develop a fluidtight seal between the mold form and the flexible member.

2. Molding apparatus of the character described comprising a relatively rigid mold form adapted to receive the material to be molded, a flexible member cooperating with the mold form to form a molding space therebetween, a compressible sealing strip secured to said flexible member all around the molding space when in the assembled relation, and means for evacuating the molding space to force the flexible member against the rigid mold form to effect molding operations and concomitantly to compress the sealing strip against the mold form to effect a fluidtight seal between the flexible member and the mold form.

3. Molding apparatus of the character described as claimed in claim 2 in which a stiffening element is interposed between and secured to said compressible strip and the flexible member to form a unitary molding cover.

4. Molding apparatus of the character described comprising a relatively rigid mold form adapted to receive the material to be molded, a flexible member cooperating with the mold form to form a molding space therebetween, a pair of laterally spaced inner and outer compressible strips interposed between said flexible member and the rigid mold form about the molding space, the inner strip being transversely apertured to effect communication of the space between the strips and the molding space, and means for evacuating the space between said strips thereby to cause the flexible member to conform to the shape of the mold form to effect the molding operation and concomitantly to compress the outer strip to effect a fluid tight seal between the mold parts.

5. Molding apparatus of the character described comprising a relatively rigid mold form adapted to receive the material to be molded, a flexible member cooperating with the mold form to form a molding space therebetween, a pair of laterally spaced inner and outer strips of resilient rubber-like material interposed between the flexible member and the rigid mold form about the molding space, the inner strip being provided with a series of transverse grooves to effect communication of the space between the strips and the molding space, a flat metallic plate secured to and interposed between said spaced strips and the flexible member to effect a unitary structure, and means for evacuating the space between said strips thereby to cause the flexible member to conform to the contour of the mold form and effect the desired molding operation and concomitantly to compress the strips by means of which the outer strip effects a fluid-tight seal about the molding space.

6. Molding apparatus of the character described in claim 4, in which the mold form is provided with a groove that is contiguous to the space between the strips, said groove being in communication with the evacuating means.

7. Molding apparatus of the character described comprising a relatively rigid mold form adapted to receive the material to be molded, a flexible member cooperating with the mold form to form a molding space therebetween, a pair of laterally spaced inner and outer sealing gaskets interposed between the flexible member and the rigid mold form about the molding space, a metallic plate secured to and interposed between said sealing gaskets and the flexible member, said plate having a groove contiguous to the space between said gaskets to form a pair of spaced inner and outer depending flanges, a series of transverse indentations all around said inner flange for effecting multiple communications of the space between the gaskets with the molding space, and means for evacuating the space between said gaskets thereby to cause the flexible member to conform to the contour of the mold form to effect the desired molding operation and concomitantly to compress the outer gasket to effect a fluid tight seal between the mold parts.

8. Molding apparatus of the character described, comprising a relatively rigid mold form adapted to receive the material to be molded, a unitary cover cooperating with the mold form for defining a molding space therebetween which is sealed at its edges on evacuation thereof, said unitary cover consisting of an expansible member, a pair of laterally spaced inner and outer sealing strips about the periphery of said blanket and adapted to engage the mold form about the molding space on evacuation thereof, the inner strip having multiple transverse openings for establishing communication between the molding space and the area between the sealing strips and maintaining a spaced relation all around the periphery of the molding material, and a stiffening member secured to and disposed between said expansible member and sealing strips, and means for evacuating the area between the strips.

9. Molding apparatus as claimed in claim 8, in which the sealing strips are substantially identical in cross section so that the inner strip is compressed with the outer and operates as a pivotal portion for the equalization of forces acting on the outer strip.

JOSEPH S. HICKS.

REFERENCES CITED

The following references are of record in the file of this patent:

UNITED STATES PATENTS

| Number | Name | Date |
| --- | --- | --- |
| 2,308,453 | Potchen et al. | Jan. 12, 1943 |
| 2,329,425 | Steele | Sept. 14, 1943 |
| 2,376,805 | Peacock | May 22, 1945 |
| 2,380,573 | Beasecker | July 31, 1945 |